United States Patent [19]
Geck et al.

[11] 3,986,865
[45] Oct. 19, 1976

[54] PROCESS FOR PRODUCING STEEL

[75] Inventors: Hans Günther Geck, Hagen; Hans Jüurgen Langhammer, Bremen-Platjenwerbe, both of Germany

[73] Assignee: Klockner-Werke AG, Duisburg, Germany

[22] Filed: May 17, 1974

[21] Appl. No.: 471,073

[30] Foreign Application Priority Data
May 21, 1973 Germany............................ 2325667

[52] U.S. Cl........................................ 75/46; 75/43; 75/60
[51] Int. Cl.²......................................... C21C 7/00
[58] Field of Search ................ 75/46, 59, 60, 43, 44

[56] References Cited
UNITED STATES PATENTS

| | | | |
|---|---|---|---|
| 3,231,369 | 1/1966 | Gorlich et al............................ | 75/60 |
| 3,424,573 | 1/1969 | De Villiers............................. | 75/46 |

FOREIGN PATENTS OR APPLICATIONS

| | | | |
|---|---|---|---|
| 888,763 | 2/1962 | United Kingdom..................... | 75/60 |

*Primary Examiner*—M. J. Andrews
*Attorney, Agent, or Firm*—Michael J. Striker

[57] ABSTRACT

A charge consisting of scrap, sponge iron, pellets and the like is admitted into a vertically arranged melting chamber so as to form a column therein. A burner lance generates a flame which melts the column from below so as to produce a melt and an FeO slag. A transportable and tiltable vessel is provided beneath the melting chamber and contains a quantity of pig iron. The melting chamber has an opening at the bottom thereof through which the melt and the slag flow into the vessel to form a mixture containing between 30 and 60 percent by weight of pig iron. Alloying elements and cooling agents are added to the mixture and the resulting molten mass is then at least partially refined in the vessel by blowing with oxygen. During the blowing operation, reaction of the slag and the pig iron occurs and a pourable steel having a desired composition is thereby obtained. The melting of the charge in the melting chamber is carried out without regard to the extent of reaction of the slag and of the pig iron which is required to produce steel of the desired composition.

10 Claims, 2 Drawing Figures

PROCESS FOR PRODUCING STEEL

BACKGROUND OF THE INVENTION

The invention relates generally to a process and arrangement for the production of steel.

A process for melting scrap, particularly steel scrap, is described in the German Pat. No. 1,800,610. A column of scrap is formed in a melting chamber and a flame is directed at the column from below the same. Here, a centrally positioned, plate-shaped flame is used and the flame extends across the major part of the cross section of the column which latter is of substantially constant cross section. The plate-shaped flame is maintained so far above the bottom of the melting chamber that the melt which flows off is able to form a thermal barrier for the fire-resistant or heat-resistant lining of the melting chamber. The flame is generated by means of a burner lance which is located on the axis of the melting chamber and which extends into the latter either through the top thereof and through the column of scrap or through the bottom of the melting chamber. In this process, the melt which flows off may be introduced directly into a vessel containing molten pig iron in order to be then further processed.

It has been found that optimum melting conditions in the scrap melting chamber are obtained when the flame is produced by the combustion of a stoichiometric oil-oxygen mixture. The characteristics of the melting operation, that is, the oxidizing power of the flame and, concomitantly, the FeO slagging of the charge which occurs during melting, are to be thereby adjusted in accordance with the particular quantity of pig iron in the vessel. The requirement for optimum melting efficiency or, at least, for the minimum possible amount of slagging during melting, necessitates that certain predetermined relationships between the oil and the oxygen be maintained during melting. The difficulties of this process then reside in adjusting the melting characteristics or efficiency in correspondence with the particular quantity of pig iron to be processed.

In oxygen refining processes it is further known to fill relatively large quantities of pig iron, that is, between 70 and 75 percent, into a refining vessel and to then blow with oxygen. The blowing operation generates heat which is sufficient to heat the pig iron to the tapping temperature. In addition, there still remains an excess of heat with which it is possible to melt scrap. In this connection, it has been proposed in the publication "Stahl and Eisen", volume 92, pages 515-518 (1972) to fill molten scrap which has been produced according to the process of the German Pat. No. 1,800,610 into an L-D (Linz-Donawitz) converter. However, by proceeding in this manner, the make-up of the charge is varied solely as a result of the different cooling effects of molten or solid scrap. On the other hand, the iron which becomes slagged during melting of the scrap cannot be recovered in this manner and, in fact, the iron slagging requisite for the formation of a slag must occur anew in the L-D converter.

A refining process is further known from the German Pat. No. 1,074,607 wherein pig iron which has been melted in a pre-melting apparatus is blown in conventional manner in an oxygen converter. The pig iron used here is not produced in a blast furnace but, rather, is produced in a cupola furnace from scrap and coal. The disadvantages outlined above are not eliminated by this process.

SUMMARY OF THE INVENTION

Accordingly, it is an object of the invention to provide a process and arrangement for the production of steel whereby no adjustment of the melting characteristics in accordance with the quantity of pig iron accommodated in the receiving vessel is required.

Another object of the invention is to provide such a process and arrangement which permit superheating to be effected without external heating.

A further object of the invention is to provide such a process and arrangement which permit the time span required for refining to be considerably shortened as opposed to conventional refining processes.

An additional object of the invention is to provide such a process and arrangement which permit a reduction of the FeO slag formed during melting to be achieved during refining.

It is also an object of the invention to provide such a process and arrangement which permit the production of steel to be effected by the continuous melting of scrap, sponge iron, pellets or the like.

These objects, as well as others which will become apparent, are achieved in accordance with the invention. According to the invention, in a process for the production of steel from a charge and pig iron wherein the charge is admitted into a vertically arranged melting zone and melted from below with a flame so as to produce a melt and an FeO slag, there is provided the improvement which comprises melting the charge independently of the extent of reaction of the FeO slag and of the pig iron required to produce a steel having a desired composition. The melt, the FeO slag and the pig iron are combined to form a mixture containing about 30 to 60 percent by weight of pig iron and alloying elements are added to the mixture. The resulting molten material is blown with oxygen to refine the same with concomitant reaction of the FeO slag and of the pig iron to produce a pourable steel having the desired composition.

Of particular, although not exclusive, interest for the invention is a process for the production of steel by the melting of scrap, sponge iron, pellets or the like. Thus, the charge may include scrap such as iron scrap; pre-reduced, uncompressed or compressed pellets, and so on. Of course, the charge may comprise mixtures of these substances. The melting of the charge, which is effected by directing a flame at the charge from below, may proceed continuously. Steel is produced with the admixture of pig iron. If desired or necessary, cooling agents or slag building additions or the like may be added to the mixture of melt, FeO slag and pig iron in addition to the alloying elements. The oxygen blown in during the refining operation may be partially replaced or substituted by the quantity of oxygen introduced by the slag, which latter oxygen is brought in as chemically bound FeO.

The refining operation is carried out in a converter which may be operated as an L-D converter and the waste gases generated during the refining operation may be used for preheating the charge to be melted. The slag produced during melting of the charge may serve as a source of oxygen in addition to the oxygen which is blown in and, consequently, the part of the iron which becomes slagged during the melting operation and which would have to be regarded as a quasi loss if the slag were removed, can, for the most part, be recovered. In normal L-D processes, an equilibrium is established between the iron oxide content of the slag and the metal bath, that is, between the slagging and, concomitantly, the loss of iron in the charge to the slag, and the metal bath. This slagging equilibrium first comes into existence during the oxygen blow and terminates at the end of the process. When more iron oxide slag is present at the beginning of the blowing process than corresponds to the equilibrium between slag and metal, the iron oxide content of the slag decreases continuously towards the equilibrium value, that is, this iron oxide, together with the blown oxygen, oxidizes the impurity elements (C, Si, Mn, etc.) of the pig iron and is itself reduced to iron thereby being recovered in the process. Thus, reduction of the FeO slag may occur during the refining operation by virtue of the equilibrium existing between slag and metal bath at the end of the refining operation. The major part of the iron slagged during the melting operation can be directly recovered only when the slagged iron is filled into the converter. When no iron oxide slag is admitted into the converter, it is first necessary, for the formation of slag, that iron becomes slagged to the extent corresponding to the equilibrium. This loss of iron may be compensated for by the iron oxide formed during the melting operation and any iron oxide admitted into the converter which is in excess of the equilibrium value may then be correspondingly reduced and thereby recovered.

By using the process of the invention, relatively great flexibility is obtained in the make-up of the charge as regards higher pig iron contents without the necessity of an adjustment for the pig iron contents in the melting conditions. The quantity of oxygen necessary for the refining operation is determined by the chemical composition of the molten mixture, that is, by the content of the elements which must be removed during refining. Superheating may be effected and the superheating temperature, as opposed to the temperature of the mixture of molten scrap, pig iron and slag, may, in particular, be attained without external heating. As in other oxygen refining processes, the temperature adjustment is achieved by a consideration of the temperature of the mixture, the heat of reaction generated by the oxygen reactions during refining and the addition of cooling agents.

Basically, any oxygen refining procedure may be used for transforming the mixture of molten scrap, molten slag produced during melting, pig iron and additions such as lime, etc., into steel. It is irrevelant in this regard whether the oxygen used for refining is introduced from below, from above or in some other manner. Regardless of which oxygen refining procedure is used for the invention, this corresponds, in the progression of its metallurgical processes, to the last phases, that is, to the last half and, advantageously, the last 10 to 25 percent, of other corresponding oxygen refining procedures such as, for instance, the L-D process. Thus, according to the invention, a significant shortening of the oxygen refining process may be achieved. The time required for refining is shorter as opposed to normal L-D processes since, in accordance with the invention, it is no longer necessary to refine 70 to 75 percent by weight of pig iron with oxygen but only 30 to 60 percent by weight of pig iron need be refined with oxygen. For example, the invention may start with 40 percent by weight of pig iron in the mixture whereas, in normal L-D processes, this percentage of pig iron is only achieved after about half of the refining time has elapsed. It is in this manner that the process of the invention is similar to the last and not the initial phases of the known oxygen refining processes. The refining time may be still further reduced when FeO slag is introduced since the quantity of oxygen brought in with the slag permits the amount of blown oxygen to be decreased. It should be mentioned that the total metallic charge may be less since the iron content of the slag may be recovered but that the pig iron component need not be less.

Aside from the great flexibility which may be achieved with the process of the invention, the fact that an additional, external heating may be eliminated is also of advantage, particularly since the oxygen refining procedure proceeds exceedingly rapidly and, in this manner, the requisite superheating temperature may be attained without difficulty during this short procedure and without further ado. Furthermore, the proportions of scrap and pig iron in the charge may be approximately reversed as opposed to the conventional refining processes and, in particular, the scrap component may be about double the pig iron component. Thus, a significant saving of expensive pig iron in the production of steel may be achieved and a converter process on a scrap basis is obtained from a converter process which is normally heavily reliant on pig iron.

The mixture of pig iron and molten scrap may, via suitable transporting means, be introduced into a conventional converter vessel such as for instance, an L-D crucible, and refined to completion therein.

The invention further provides an arrangement for the production of steel from a charge, particularly scrap, pre-reduced uncompressed or compressed sponge iron, uncompressed or compressed pellets and the like, which includes a vertically arranged melting chamber adapted to accommodate a column of the charge and a burner lance for directing a flame at the leading end of the column so as to melt the charge. A receiving chamber is provided for accommodating the melted charge and the receiving container is constructed as a converter which is movable between a plurality of positions. The arrangement in accordance with the invention is particularly well suited for carrying out the process of the invention.

The burner lance may extend into the melting chamber either through the column of charge or through the bottom of the melting chamber. The receiving container may be transportable or portable and, if desired, may be mounted on a suitable transporting device for conveying it to and away from the melting chamber. In such an event, it is advantageous for the receiving container to be movably mounted on the transporting device, particularly for tilting movement. If the receiving container is not mounted on a transporting device, then there is advantageously provided means for movably mounting the receiving container adjacent the melting chamber, it being again particularly favorable for the receiving container to be tiltable.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
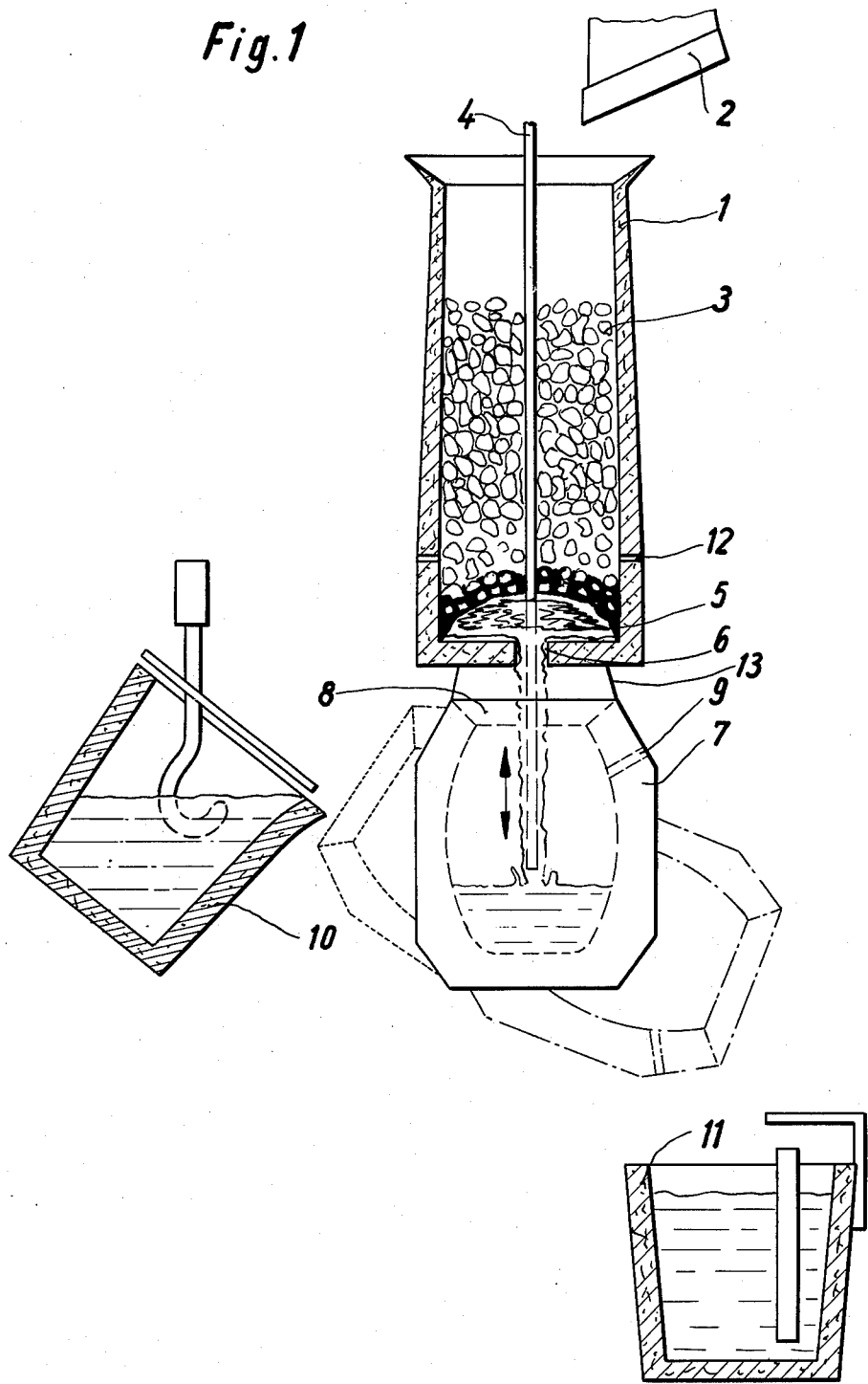
FIG. 1 represents schematically one form of an arrangement according to the invention which may be used for carrying out the process of the invention.

As already mentioned, the arrangement in accordance with the invention comprises a melting chamber, a burner lance for melting the charge and a receiving container for accommodating the melted charge, which receiving container is constructed as a converter and is advantageously transportable and tiltable. By using the arrangement of the invention, very favorable conditions may be obtained. For instance, with two or three circulating converters, a cyclic rhythm may be maintained, that is, a cycle which includes a filling phase during which the converter is filled, a refining phase and a pouring or casting phase. Normally, two interchangeable containers and two stations (melting station and refining station) will be sufficient here while there will be an additional container which is in a preparation stage. In this manner, a greater efficiency of energy utilization may be achieved and transporting ladles or pots may be eliminated. In addition, a more efficient utilization of the capacity of the containers may be obtained as opposed to an operation using intermediate transport means. Since the refining phase is relatively short as contrasted with the filling phase, there is available an adequate time reserve during filling of one of the containers for the other operating procedures, such as pouring, filling with pig iron, changing over and so on.

For the case where the receiving chamber is constructed as a converter beneath the melting chamber, a favorable embodiment of the invention resides in refining with oxygen immediately after completion of filling of the receiving container and while the latter is still beneath the melting chamber. The melting process may be interrupted here. However, with an uninterrupted melting operation, it is also possible to drain off the molten metal and introduce it into the converter.

When using a burner lance which extends through the column of charge in the melting chamber, it is further possible to effect the refining operation with this burner lance. In such an event, the burner lance is also constructed as a refining lance and may be admitted into the receiving container via the outlet opening for the melted scrap provided in the bottom of the melting chamber.

In particular, however, it is also possible to continuously refine with oxygen while the molten charge is flowing into the receiving container. If the refining operation is undertaken simultaneously with the filling of the receiving container, then the introduction of the oxygen for the refining operation is advantageously effected via nozzles or openings provided at the bottom of the latter. The nozzles or openings may be configurated approximately as ring-shaped or annular slitted or split nozzles. By virtue of the relatively long refining period required as determined by the filling rate, and by virtue of the small pig iron charge, only a relatively small number of bottom nozzles is necessary.

In both cases, that is, in the case where refining is effected with the burner lance and in the case where refining is effected via bottom nozzles, the refining gases generated during the refining operation may be utilized in the melting chamber to heat the material which is to be melted. This may be accomplished by admitting the gases into the melting chamber and afterburning them therein. There is then obtained aa total thermal efficiency which may lie between 80 and 95 percent and which has otherwise, with melting processes relying heavily on scrap, never even been approximated.

Since the boiling operation proceeds relatively slowly, the receiving chamber which is constructed as a converter may have a relatively small converter volume of about 0.3 to 0.5 cubic meters per ton. Also, a comparatively small mouth opening for the converter is sufficient here since, aside from the small and relatively uniformly generated quantities of waste gases which need be removed, it is only necessary to add very little, if any, scrap for thermal corrections. In this manner, the provision of a seal between the converter container and the melting chamber for the purpose of afterburning the refining gases and preheating the charge while preventing the introduction of infiltrated air is simplified.

An arrangement for the introduction of oxygen or air may be provided in the melting chamber above the melting surface or melting region for the purpose of after-burning the refining gases. Such an arrangement may be in the form of an approximately ring-shaped or annular slit. In adjusting the oxygen for the combustion, or in adjusting the after-burning, it is necessary to take into account the waste gases which are diverted into the melting chamber. When using a burner lance which extends into the melting chamber from the bottom thereof, in which event the molten metal is admitted into the receiving container via an outlet or tap located sidewardly of or spaced from the location at which the burner lance enters the melting chamber, the receiving container is advantageously provided with a separate refining lance which permits the refining operation to be effected from above either simultaneously with or subsequent to the filling procedure.

Referring now to FIG. 1, it may be seen that the arrangement illustrated therein includes a melting chamber 1 which may have a substantially cylindrical cross section. The chamber 1 may widen slightly in downward direction thereof. The inside of the chamber 1 is lined with a fire-resistant or heat-resistant material.

With the aid of a charging device 2, a charge such as scrap, sponge iron, pellets or the like is admitted into the chamber 1 via a charging opening provided therein. The charge, which may be discontinously or continuously introduced into the chamber 1, forms a column 3 in the latter.

A burner lance 4 extends into the chamber 1 through the top thereof and through the column 3. The burner 4 is centrally located in the column 3. At the lower end of the burner 4 there is provided an oil-oxygen burner which generates a flame 5. The flame 5 is directed at the column 3 from below and continuously melts the same. As the lower or leading end of the column 3 melts, fresh charge moves downwardly in the chamber 1 to become exposed to the action of the flame 5.

An opening 6 is provided in the bottom of the chamber 1 and the molten material, that is, the slag and the molten scrap or melt, flows out of the chamber 1 via the opening 6. Below the chamber 1, there is located a receiving container 7 into which the molten material may flow. The container 7 is constructed or designed as a converter and is mounted for tilting movement. In addition, the container 7 may be transportable to and away from the chamber 1 and, if desired, the container 7 may be mounted on a suitable transporting or supporting device for this purpose, which transporting device has, however, not been illustrated for the sake of clarity. The container 7 is provided with a filling opening 8 and a tapping or outlet opening 9.

The container 7 is initially brought into the position indicated by the dashed lines. When the container 7 is in this position, molten pig iron is filled into it from a vessel 10. Thereafter, the container 7 is brought into its upright position so that the molten material from the chamber 1 may be filled into the container 7 via the opening 8 thereof. If desired or necessary, cooling agents and additions i.e. of alloying elements such as silicon and manganese may be introduced either during filling of the container 7 with the molten material or subsequent thereto. After filling of the container 7, the melting operation is interrupted and the burner lance 4, which is movably mounted, is lowered into the container 7 as indicated by the dashed line so that, by means thereof, oxygen may be blown onto the molten material in the container 7 and the mixture of pig iron, molten scrap and slag may thereby be refined to completion. Thereafter, the container 7 is tilted into the position shown in dash-dot lines so that the finished steel may be poured or tapped and admitted into a vessel 11.

Instead of the procedure described, it is also possible to convey the mixture of pig iron, molten scrap and slag to a conventional converter by means of a suitable conveying or transporting arrangement and to refine the mixture to completion in such a converter. Moreover, the container 7 and the chamber 1 may be constructed or designed for interchangeability in order to permit a plurality of containers such as the container 7 to be used and thereby achieve an operation wherein, for example, one container is being filled while a refining procedure is being carried out in another.

In order to minimize the introduction of infiltrated air, the container 7 is provided with a schematically illustrated sealing member 13 which is located between the chamber 1 and the container 7 when the latter is in its upright position.

The waste gases generated during the refining operation may flow into the chamber 1. The latter is provided with a somewhat ring-shaped or annular slot 12 through which oxygen or air may be admitted into the chamber 1. This permits the waste gases of the refining operation, as well as the combustion or waste gases generated by virtue of the melting operation, to be after-burned in the chamber 1 at a location above the surface or region where melting takes place. Such after-burning is effective for preheating the material in the chamber 1 which is to be melted.

Figure 2:
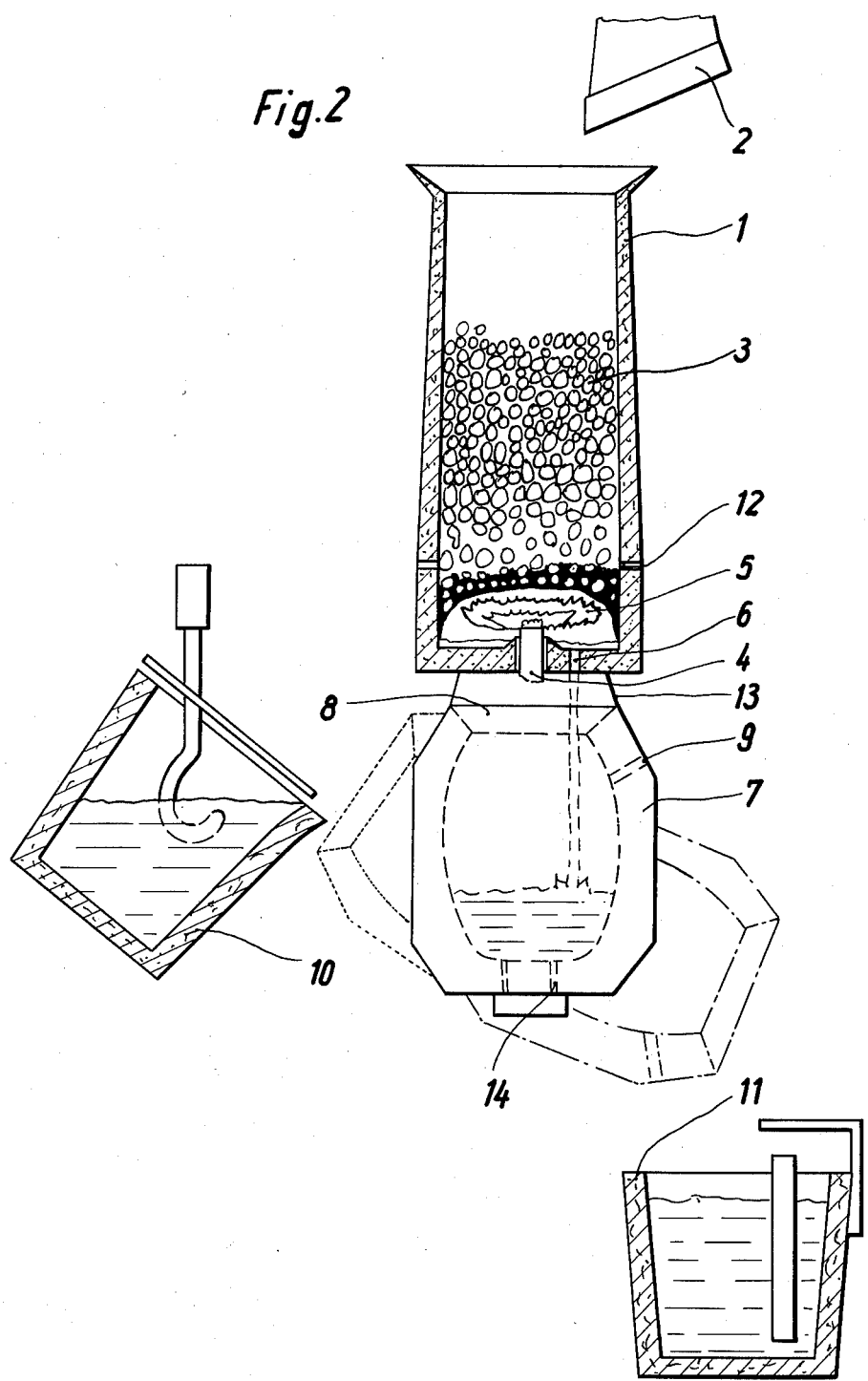
FIG. 2 represents schematically another form of an arrangement according to the invention which may be used for carrying out the process of the invention.

FIG. 2 shows an arrangement which corresponds in many respects to that of FIG. 1 and the same reference numerals as in the latter have been used to designate similar components. The arrangement of FIG. 2 differs from the arrangement of FIG. 1 in that melting of the charge is effected by means of a burner lance 4 which extends into the chamber 1 from below and through the bottom of the latter. It may be seen that the outlet 6 for the molten material is positioned sidewardly of the burner 4, that is, is somewhat spaced from the location at which the burner 4 extends into the chamber 1.

The receiving container 7 is here provided with bottom nozzles or openings 14. The nozzles 14 permit oxygen for the refining operation to be continuously introduced into the container 7. It is also possible to provide an additional lance for the container 7 for the purpose of refining the contents thereof.

It will be understood that each of the elements described above, or two or more together, may also find a useful application in other types of processes and arrangements differing from the types described above.

While the invention has been illustrated and described as embodied in a process and arrangement for producing steel, it is not intended to be limited to the details shown since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characterisitics of the generic or specific aspects of this invention.

What is claimed as new and desired to be protected by Letters Patent is set forth in the appended claims.

We claim:

1. A process for making steel, comprising introducing an iron-containing charge into a substantially vertically arranged melting vessel; melting said charge by supplying heat to said charge from below the latter so as to obtain a molten mass which includes an FeO-containing slag; forming a mixture which includes said molten mass and a quantity of pig iron by admitting said molten mass and said pig iron into a receiving vessel; blowing an oxygen-supplying gaseous medium into said receiving vessel so as to refine said mixture; retaining said slag in said receiving vessel during said blowing; reducing at least a portion of the FeO in said slag during said blowing so that slagged iron is recovered from said FeO while oxygen is liberated from the same thereby providing part of the oxygen required for refining of said mixture; and superheating said mixture substantially exclusively be reaction between said mixture and the total oxygen obtained from said gaseous medium and from said reduction of said FeO.

2. The process of claim 1, wherein said receiving vessel is arranged below said melting vessel and said molten mass enters said receiving vessel by gravity flow.

3. The process of claim 1, wherein said mixture is formed in said receiving vessel.

4. The process of claim 1, wherein said charge comprises scrap iron and the amount of scrap iron in said mixture is about twice the amount of pig iron.

5. The process of claim 1, wherein said quantity of pig iron is between about 30 and 60 percent by weight of said mixture.

6. The process of claim 1, wherein the thermal efficiency is increased by admitting waste gases generated in said receiving vessel into said melting vessel and after-burning said waste gases together with waste gases generated in said melting vessel by supplying a gaseous oxygen-supplying medium to said melting vessel.

7. The process of claim 1, wherein said gaseous medium includes a member selected from the group consisting of air and substantially pure oxygen.

8. The process of claim 1, wherein said charge comprises a member selected from the group consisting of from scrap and sponge iron and said melting comprises substantially continuously melting said charge by directing a flame at said charge from below the same.

9. The process of claim 1, said pig iron being admitted into said receiving vessel prior to said molten mass; and wherein said molten mass is substantially continuously admitted into said receiving vessel from said melting vessel and said blowing is performed substantially continuously during admission of said molten mass into said receiving vessel.

10. The process of claim 1, wherein said quantity of pig iron is at most about 60 percent by weight of said mixture.

* * * * *